(12) United States Patent
Hama et al.

(10) Patent No.: US 6,317,245 B1
(45) Date of Patent: Nov. 13, 2001

(54) MULTI-BEAM SCANNING OPTICAL SYSTEM

(75) Inventors: Yoshihiro Hama; Yasushi Suzuki, both of Saitama-ken; Susumu Mikajiri, Chiba-ken, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,442

(22) Filed: Jun. 22, 2000

(30) Foreign Application Priority Data

Jun. 25, 1999 (JP) .................................................. 11-179222

(51) Int. Cl.$^7$ .................................................. G02B 26/08
(52) U.S. Cl. .................... 359/204; 359/205; 359/206; 359/216; 347/232; 347/233; 347/235; 347/243; 347/244
(58) Field of Search ..................................... 359/204–207, 359/216–219; 347/232, 233–235, 241–244

(56) References Cited

U.S. PATENT DOCUMENTS

| | | |
|---|---|---|
| 4,962,983 | 10/1990 | Watanabe . |
| 5,181,137 | 1/1993 | Koide . |
| 5,251,055 | * 10/1993 | Koide ................................. 359/204 |
| 5,715,078 | * 2/1998 | Shiraishi ............................. 359/204 |
| 5,748,355 | * 5/1998 | Shiraishi et al. ..................... 359/204 |
| 5,784,094 | 7/1998 | Ota et al. . |
| 5,808,772 | * 9/1998 | Yamaguchi et al. ................ 359/204 |

FOREIGN PATENT DOCUMENTS

| | | |
|---|---|---|
| 1164917 | 6/1989 | (JP) . |
| 2-58015 | 2/1990 | (JP) . |
| 6160743 | 6/1994 | (JP) . |
| 9-5656 | 1/1997 | (JP) . |
| 10133131 | 5/1998 | (JP) . |

* cited by examiner

Primary Examiner—James Phan
(74) Attorney, Agent, or Firm—Greenblum & Bernstein, P.L.C.

(57) ABSTRACT

A multi-beam scanning optical system is provided with a light source unit emitting a plurality of beams. The beams are incident on a polygonal mirror, and deflected thereby to scan in a predetermined scanning range. The scanning beam is incident an fθ lens system. The fθ lens system includes a plurality of lenses, and all the beams pass at least one of the plurality of lenses included in the fθ lens system. The lens, which all the beams pass through, is formed as a single lens element made of single material. Further, the lens contributes to convergence of the beams in the main scanning direction.

11 Claims, 5 Drawing Sheets

MULTI-BEAM SCANNING OPTICAL SYSTEM

BACKGROUND OF THE INVENTION

The present invention relates to a multi-beam scanning optical system in which a plurality of light beams emitted by a plurality of light source are deflected to scan on a surface to be scanned such as a circumferential surface of a photoconductive drum.

A scanning optical system to be employed in a laser printer for forming a monochrome (e.g., a black-and-white) image is provided with a laser diode, which is driven in accordance with image data. The laser beam emitted by the laser diode is collimated by a collimating lens, and is directed to a deflecting member such as a polygonal mirror. The laser beam, which is incident on light reflecting surfaces of the rotating polygonal mirror, is deflected to scan within a predetermined angular range. The scanning laser beam is incident on an fθ lens, refracted and converged thereby, and then is incident on an evenly charged photoconductive surface of a photoconductive drum to form a beam spot which moves along the rotational axis of the photoconductive drum (i.e., along a main scanning direction). Since the laser diode is driven in accordance with the image data, the surface of the photoconductive drum is exposed to light corresponding to the image data. While the light beam scans on the surface of the photoconductive drum, it is rotated (i.e., an auxiliary scanning is performed). Thus, a two-dimensional latent image is formed on the photoconductive surface of the photoconductive drum.

Then, toner is applied to the latent image to form a developed image, which is transferred onto a recording sheet and fixed thereon.

Recently, color laser beam printers, which is capable of forming a color image, has been developed. In the color laser printer, generally, a plurality of laser diodes are provided (which will be referred to as a multi-beam laser printer). Further, the corresponding number of fθ lenses, and the corresponding number of photoconductive drums are provided for forming images of respective color components (e.g., yellow, magenta, cyan and black components). The above-described, exposing and developing processes are performed for each color component, and thus formed color image (developed image) consisting of the four color components is transferred on a recording sheet and fixed.

In the multi-beam laser printer as described above, since a plurality of fθ lenses are employed for respective color components, the problems indicated below occur.

Firstly, if temperature differences are caused among the fθ lenses for respective color components, the optical characteristics of the fθ lenses may vary among the fθ lenses. In such a case, positional errors (i.e., displacements) occur among positions on the photoconductive drums, on which the beams emitted from the fθ lenses are incident, in the scanning direction, and therefore the formed color image may contain a color shift.

Secondly, since a plurality of fθ lenses are provided for the respective color components, a structure of the optical system tends to be complicated.

SUMMARY OF THE INVENTION

In view of the above problems, it is an object of the present invention to provide an improved multi-beam scanning optical system which has a simplified structure of the optical system and can prevent the color shift.

For the above object, according to the present invention, there is provided a multi-beam scanning optical system, which is provided with a light source unit emitting a plurality of beams, the plurality of beams being parallel to each other, a polygonal mirror having a plurality of reflection surfaces arranged along a rotational direction of the polygonal mirror, the plurality of beams emitted by the light source unit being incident on the polygonal mirror and reflected by the reflection surfaces of the polygonal mirror, and an fθ lens system including a plurality of lenses, the plurality of beams reflected by the reflection surface of the polygonal mirror passing through the fθ lens system and proceeding toward surfaces to be scanned. The plurality of beams reflected by the reflection surfaces of the polygonal mirror pass through at least one of the plurality of lenses, which is a single lens element formed of single material.

Since all the beams pass through at least one common lens, the structure of the scanning optical system can be simplified. Further, even if the optical characteristics of the lens, through which all the beams pass, are changed, the change affects by the same amount for all the beams, and therefore, the color shift may be well suppressed.

Preferably, the at-least-one of the plurality of lenses mainly contributes to convergence of the plurality of beams in a main scanning direction. In this case, the color shift can be suppressed effectively.

Optionally, the fθ lens system includes a first lens, a second lens and a third lens, the plurality of beams passing through the first, second and third lenses in this order, and the at-least-one of the plurality of lenses may include the second lens.

Optionally, the second lens converges beams passed therethrough in the main scanning direction.

Further optionally, the first lens converges beams passed therethrough in the auxiliary scanning direction.

Still optionally, the third lens is provided for each of the plurality of beams, the third lens mainly converges a beam passed therethrough in the auxiliary scanning direction.

Furthermore, a plurality of third lenses are provided at positions facing a plurality of surfaces to be scanned, respectively.

Still optionally, each of the reflection surfaces of the polygonal mirror consists of a single reflection surface that reflects all of the plurality of beams.

In this case, the multi-beam scanning optical system may further include a horizontal synchronizing signal generating system provided with a light receiving element. In this case, the light source unit may include a plurality of light sources respectively emitting the plurality of beams, and one of the plurality of beams deflected by the polygonal mirror is directed to the light receiving element. The plurality of light sources being driven in accordance with an output of the horizontal synchronizing signal generating system.

According to this configuration, all the beams are controlled in accordance with the horizontal synchronizing signal generated based on a single beam, optical and electrical structure of the scanning optical system can be simplified.

Optionally, the light source emits four light beams for forming four different color images. In this case, the four different colors may include, for example, yellow, magenta, cyan and black. Of course, the invention is not limited to the four color system. Any number of beams and corresponding number of colors may be employed.

Still optionally, the surfaces to be scanned include surfaces of a plurality of photoconductive drums for forming different color images, rotational axes of the plurality of photoconductive drums extending in the main scanning direction, the rotational axes of the plurality of photoconductive drums being parallel and apart from each other in the auxiliary scanning direction that is perpendicular to the main scanning direction.

According to another aspect of the invention, there is provided a multi-beam laser printer for forming an image consisting of a plurality of color components in accordance with an electrophotographic imaging process. The printer is provided with a scanning optical system, which includes a light source unit emitting a plurality of beams, the plurality of beams being parallel to each other, a polygonal mirror having a plurality of reflection surfaces arranged along a rotational direction of the polygonal mirror, the plurality of beams emitted by the light source unit being incident on the polygonal mirror and reflected by the reflection surfaces of the polygonal mirror, and an fθ lens system including a plurality of lenses, the plurality of beams reflected by the reflection surface of the polygonal mirror passing through the fθ lens system and proceeding toward photoconductive surfaces to be scanned.

In this case, the plurality of beams reflected by the reflection surfaces of the polygonal mirror pass through at least one of the plurality of lenses, the at-least-one of the plurality of lenses is a single lens element formed of single material.

DESCRIPTION OF THE ACCOMPANYING DRAWINGS

DESCRIPTION OF THE EMBODIMENT

Hereinafter, the invention will be described with reference to the accompanying drawings. It should be noted that in the embodiment described below, the multi-beam scanning optical system according to the invention is applied to a color printer for forming a color image in accordance with an electrophotographic imaging process.

Figure 1:
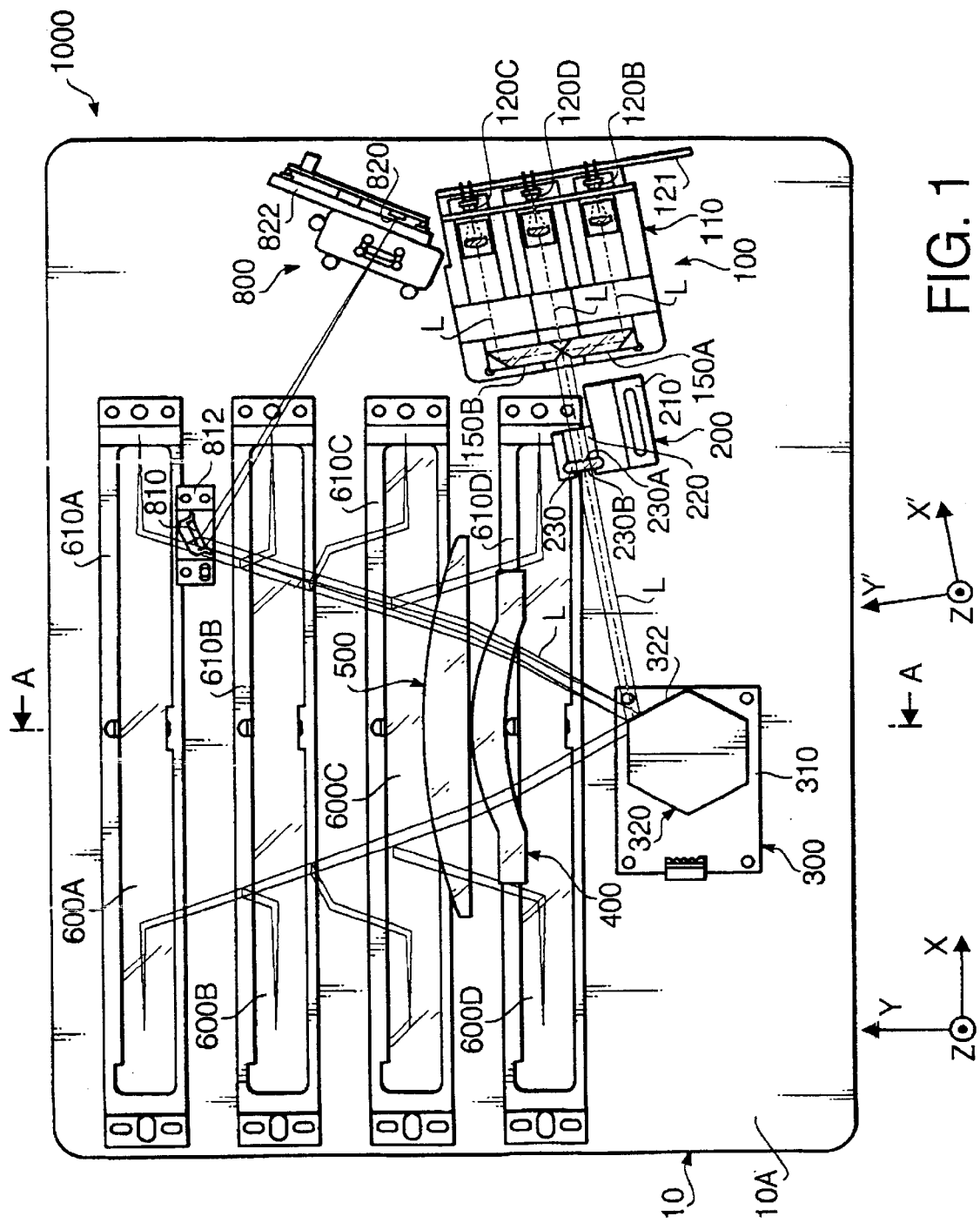
FIG. 1 is a plan view of a multi-beam scanning optical system according to an embodiment of the present invention.
Figure 2:
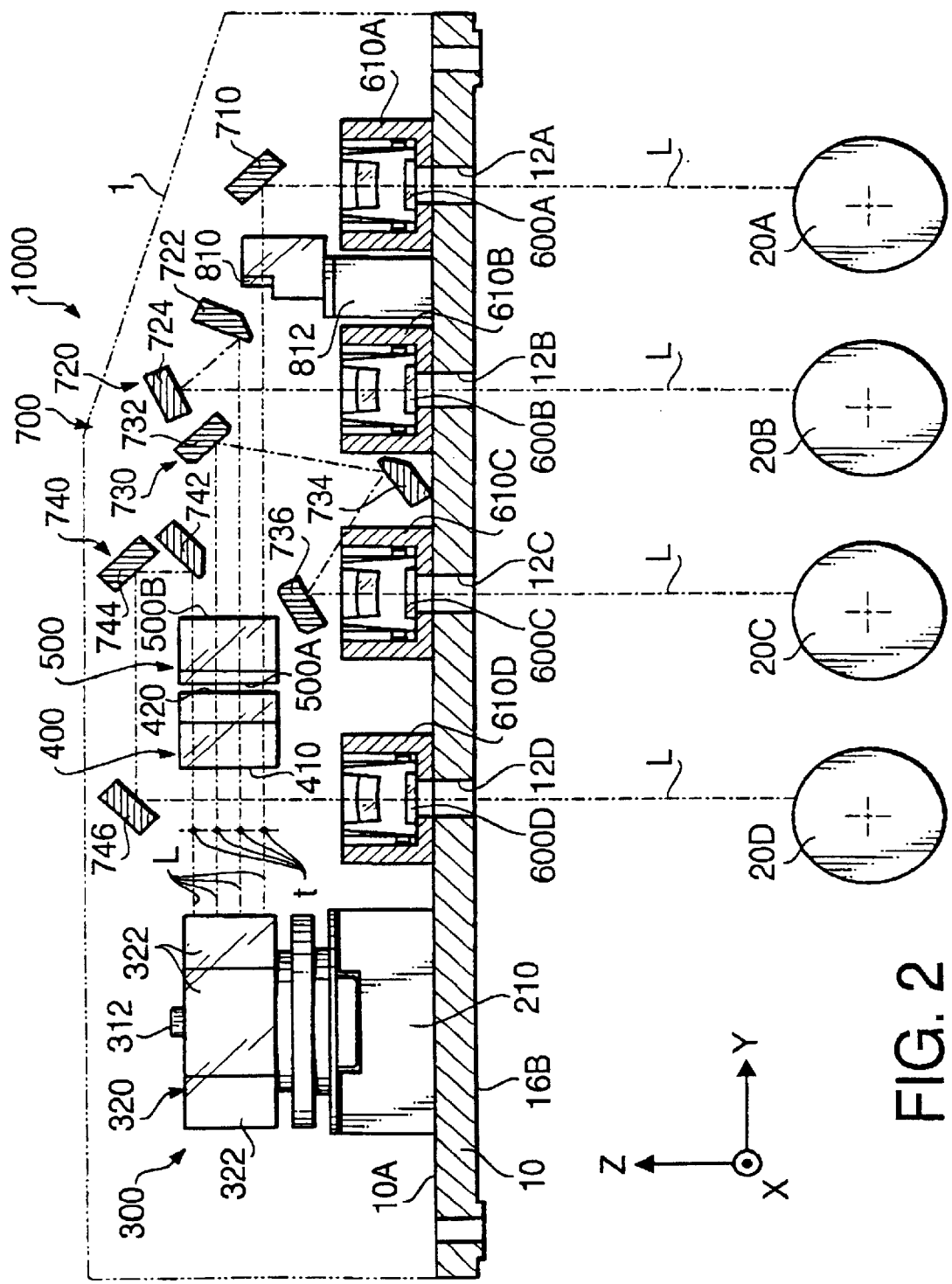
FIG. 2 is a cross sectional view of the multi-beam scanning optical system taken along line A—A in FIG. 1.

FIG. 1 is a plan view showing a structure of a multi-beam scanning optical system 1000. FIG. 2 shows a cross sectional view of the multi-beam scanning optical system 1000 taken along line A—A in FIG. 1. FIG. 4 shows a light source unit 100 employed in the multi-beam scanning optical system 100 viewed along arrow B in FIG. 3. and FIG. 5 shows the light source unit 100 viewed along arrow C in FIG. 3.

The multi-beam scanning optical system 1000 includes a casing 1. FIG. 1 shows an arrangement of various elements provided on an upper surface 10A of the bottom plate 10 of the housing 1. As shown in FIG. 1, the light source unit 100, a cylindrical lens unit 201, a polygonal mirror unit 300, a first fθ lens 400, a second fθ lens 500 and third fθ lens groups 600A–600D, a mirror unit 700, a horizontal synchronizing signal detection unit 800, and the like are mounted on the upper surface 10A of the bottom plate 10. In FIG. 1, two coordinate systems, XYZ coordinate system and X'Y'Z coordinate system are indicated. In the XYZ coordinate system, Y-axis is parallel with the optical axis of the fθ lenses 400, 500, 600A–600D, X-axis is parallel to the upper surface 10A and perpendicular to the Y-axis, and Z-axis is perpendicular to X-axis and Y-axis. In the X'Y'Z coordinate system, X'-axis is parallel to an optical path from the light source unit 100 to the polygonal mirror unit 300, and Y'-axis is perpendicular to both Z-axis and X'-axis.

As shown in FIG. 2, the bottom plate 10 extends horizontally (i.e., parallel to an X-Y plane) when the scanning optical system is in use, and four photoconductive drums 20A–20D are arranged in Y-axis direction at a predetermined interval with respect to each other, with a predetermined clearance provided with respect to the lower surface 10B of the bottom plate 10. The rotation axes of the photoconductive drums 20A–20D extend in X-axis direction, and are parallel to each other.

The four photoconductive drums 20A–20D are provided for forming images of yellow, magenta, cyan and black components, respectively. That is, the latent images formed on the photoconductive drums 20A–20D are developed with yellow, magenta, cyan and black toner, and then the developed images are transferred onto a recording sheet.

The multi-beam scanning optical system 1000 operates as described below.

Four laser beams L emitted from the light source unit 100 pass through a cylindrical lens 230 and directed to the polygonal mirror unit 300. The beams L are deflected by the polygonal mirror unit 300 to scan within a predetermined angular range in the main scanning direction.

The scanning laser beams L pass through the first fθ lens 400 and the second fθ lens 500. Then, the four laser beams L are directed to and pass through the third fθ lenses 600A–600D, and incident on the photoconductive drums 20A–20D, respectively. Thus, the beam spots formed by the four laser beams L scan on the photoconductive drums 600A–600D, respectively.

The laser beams L deflected by the polygonal mirror unit 300 are directed to a light receiving sensor 820 of the horizontal synchronizing signal generating unit 800. Based on the output of the light receiving sensor 820, a timing of image formation on the photoconductive drums 600A–600D in the main scanning direction is adjusted.

It should be noted that the main scanning direction is a direction parallel to the rotation axes of the photoconductive drums 600A–600D (i.e., X-axis direction), and an auxiliary scanning direction is defined as a direction perpendicular to the main scanning direction.

Hereinafter, a structure of each unit will be described in detail.

Figure 3:
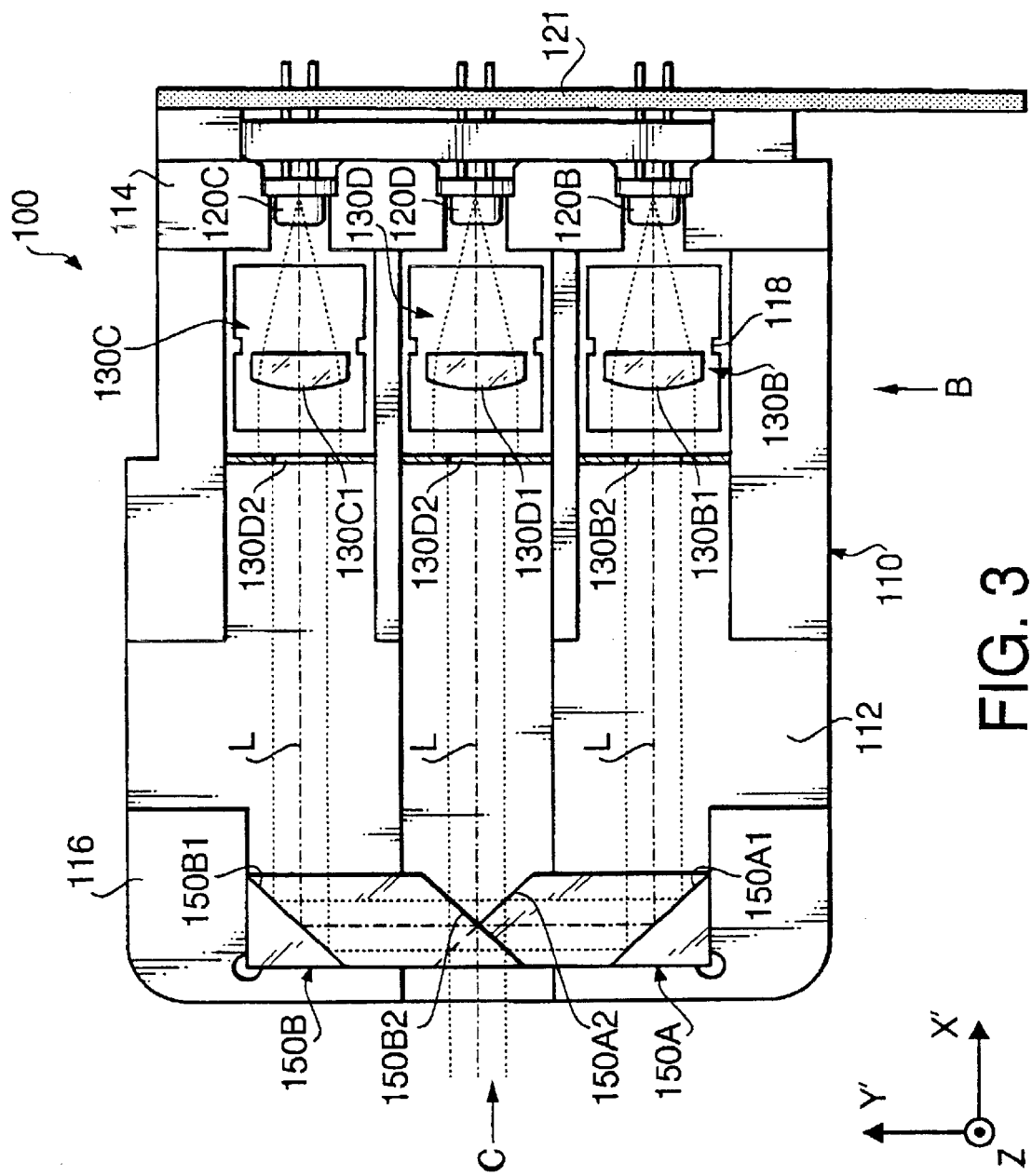
FIG. 3 is a plan view of a light source unit of the multi-beam scanning optical system.
Figure 4:
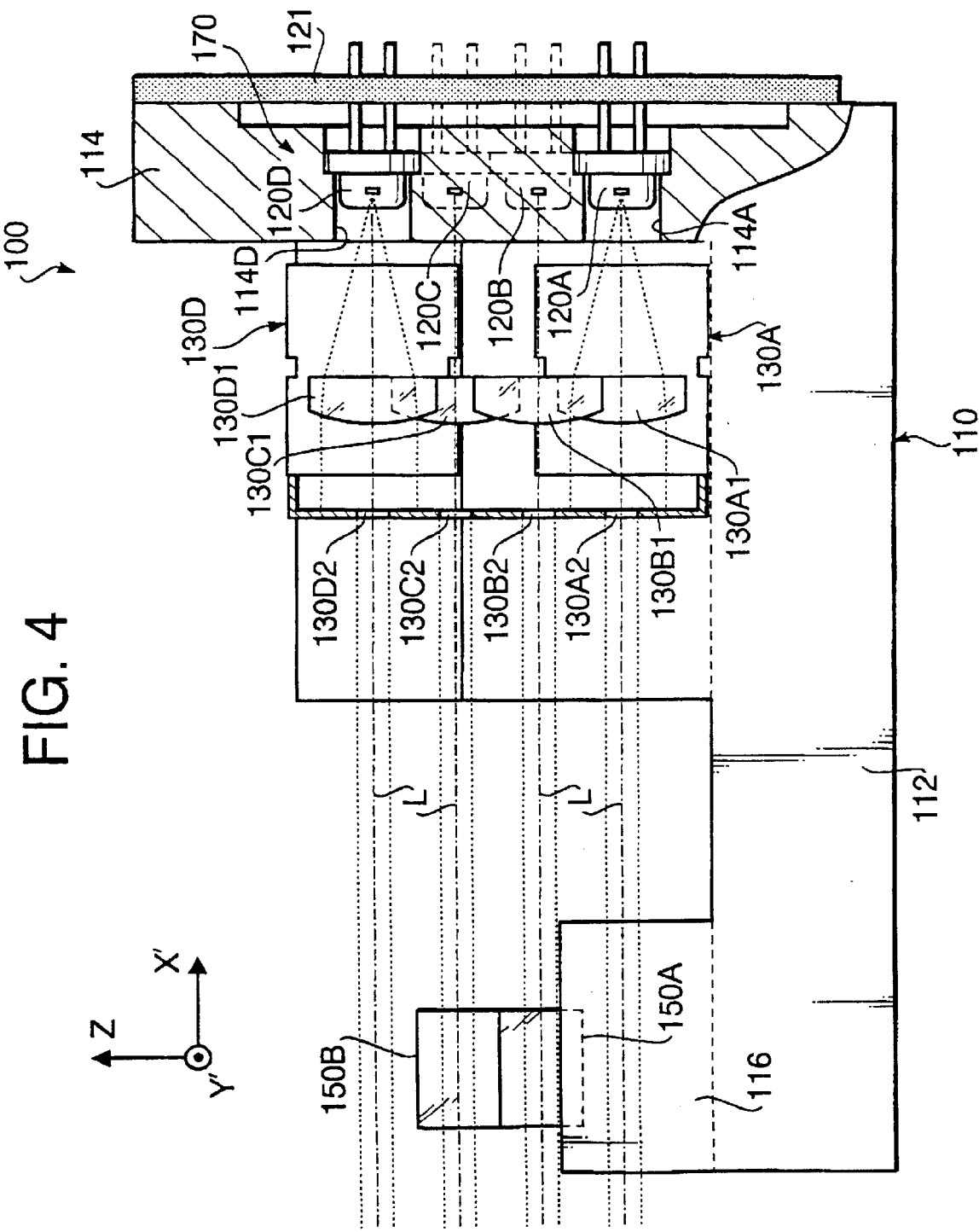
FIG. 4 shows the light source unit viewed along arrow B in FIG. 3.
Figure 5:
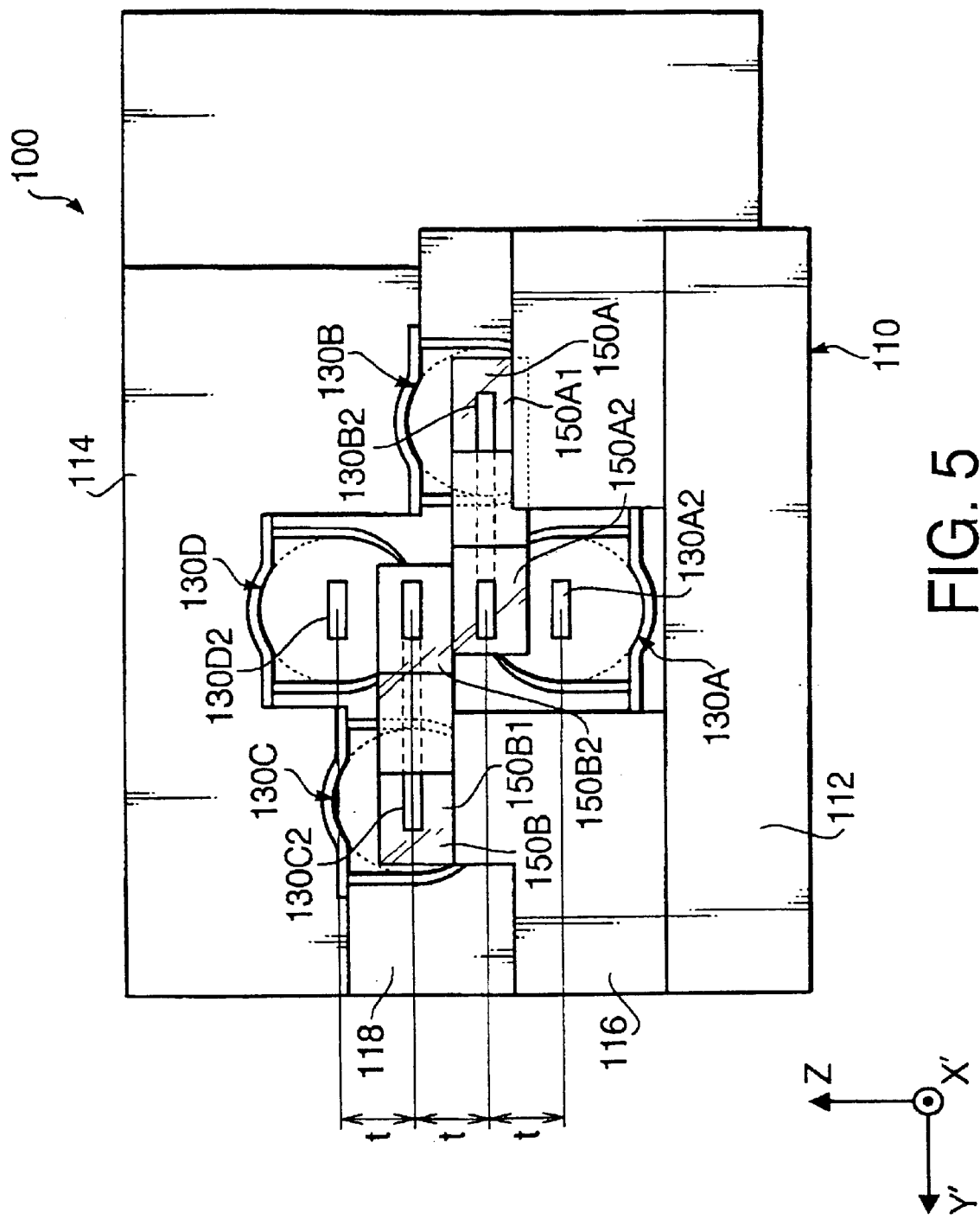
FIG. 5 shows the light source unit viewed along arrow C in FIG. 3.

As shown in FIGS. 3, 4 and 5, the light source unit 100 has a housing 110, four laser diodes 120A–120D, four collimating lenses 130A–130D, two prisms 150A and 150B, a laser driving circuit, and the like.

The housing 110 has a rectangular base 112 secured on the upper surface 10A of the bottom plate 10, a wall 114 rising at the edge of the base 112, a pedestal 116 provided at an opposite side of the wall 114, and a lens holder unit 118 facing the pedestal 116.

The laser diodes 120A–120D are held by the wall 114 such that front ends (i.e., beam emitting ends) thereof are perpendicular to the wall 114, and the laser beams emitted by the laser diodes 120A–120D are parallel to each other.

Lead lines provided at rear ends of the laser diodes 120A–120D are connected to a circuit board 121 held at an outside of the wall 114 so that driving signals output by the laser driving circuit are supplied to the laser diodes 120A–120D, respectively.

The collimating lens units 130A–130D are supported by the lens holder unit 118 and located in front of the respective laser diodes 120A–120D.

The collimating lens units 130A–130D include collimating lenses 130A1–130D1 for collimating the laser beams emitted by the laser diodes 120A–120D, and slits 130A2–130D2, which are arranged in front of the collimating lenses 130A1–130D1.

The optical axes of the collimating lenses 130A1–130D1, and the central axes of the slits 130A2–130D2 are arranged to substantially coincide with central rays of the light beams L, respectively.

As shown in FIG. 5, the collimating lenses 130A1 and 130D1 are arranged such that the optical axes thereof are aligned along a same line extending in Z-axis direction, but apart from each other in Z-axis direction. The collimating lenses 130B1 and 130C1 are aligned such that the optical axes thereof are located at opposite side with respect to those of the collimating lenses 130A1 and 130D1 in Y'-axis direction, and apart from each other in Z-axis direction. Further, the optical axes of the lenses 130A1–130D1 are apart from each other, in Z-axis direction, by an amount t.

The prism 150A is mounted on the pedestal 116, and the prism 150B is secured on the prism 150A.

The laser beam emitted from the collimating lens 130B1 is reflected by surfaces 150A1 and 150A2 to by 90 degrees each, thereby the beam emitted from the collimating lens 130B1 proceeds along an optical path that is on a plane including the optical axes of the collimating lenses 130A1 and 130D1.

Similarly, the laser beam emitted from the collimating lens 130C1 is reflected by surfaces 150B1 and 150B2 by 90 degrees each, thereby the beam emitted from the collimating lens 130C1 proceeds along an optical path that is on a plane including the optical axes of the collimating lenses 130A1 and 130D1.

Thus, the laser beams respectively emitted from the collimating lenses 130A1–130D1 are aligned in Z-axis direction, apart from each other by the amount t, parallel with each other. That is, the light source unit 100 emits four laser beams that are aligned in the Z-axis direction and are parallel to each other.

As shown in FIG. 1, the cylindrical lens unit 200 includes a base 210 secured on the upper surface 10A of the bottom plate 10, a lens holder 220 protruded upward (i.e., in the Z-axis direction) from the base 210, and a cylindrical lens 230 held by the lens holder 220.

The cylindrical lens 230 has a light receiving surface 230A, on which the laser beams L emitted from the light source unit 100 are incident, and a light emerging surface 230B, from which the light beams L emerge.

The light receiving surface 230A is a flat plane perpendicular to the rays of the incident laser beams L. The light emerging surface 230B is formed such that four cylindrical lenses, whose generatrices extend horizontally (i.e., in Y'-axis direction), are aligned in Z-axis direction at a pitch of t. With this structure, the four laser beams L, which are apart from each other by the amount t, are incident on the light receiving surface 230A at a right angle, and emitted from the four cylindrical lens surfaces formed on the light emerging surface 230B.

Since the laser beams L pass through the cylindrical lens surfaces having a power in Z-axis direction, each beam is converged only in Z-axis direction to form a line image. It should be noted that the power of the cylindrical lens surfaces are designed such that the line images, which are elongated in Y'-axis direction, are formed substantially at reflecting surfaces 322 of the polygonal mirror 320.

The polygonal mirror unit 300 includes a motor unit 310 secured on the upper surface 10A of the bottom plate 10, and a polygonal mirror 320 secured to a spindle shaft of the motor unit 310, which extend in Z-axis direction.

The polygonal mirror 320 is formed to be equihexagonal viewed from Z-axis direction, whose side surfaces are formed as the reflection surfaces 322. It should be noted that the reflection surfaces 322 are perpendicular to the horizontal plane (i.e., the X-Y plane).

Each of the reflection surfaces 322 a single flat plane, onto which the four light beams emitted from the light source unit 100 and passed through the cylindrical lens 23 are incident simultaneously.

The motor 310 is controlled by a not-shown driving circuit to rotate counterclockwise in FIG. 1 at a predetermined speed. As the polygonal mirror 310 rotates, the laser beams L scans from right-hand side to left-hand side in FIG. 1.

The first fθ lens 400, the second fθ lens 500, and each of the third fθ lenses 600A–600D constitute an fθ lens system, which converges the each of the four laser beams L on the respective photoconductive drums 200A–200D.

Specifically, the four laser beams L deflected by the polygonal mirror 320 are incident on the first fθ lens 400, which is secured on the upper surface 10A of the bottom plate 10. The fθ lens 400 is a single member formed of single material.

The first fθ lens 400 has a light receiving surface 410 on which the laser beams L are incident, and a light emerging surface 420.

The light emerging surface 420 has four optical axes aligned in Z-axis direction, corresponding to the four laser beams L, which are parallel to each other and apart from each other by the amount t.

Accordingly, the four light beams L incident on the light receiving surface 410 with being aligned in Z direction are emerged from the light emerging surface 420. The emerged light beams are parallel to each other and apart by the amount t from each other.

The first fθ lens 400 mainly converges the incident laser beam in Z-axis direction (i.e., in the direction of the auxiliary scanning). That is, a power of the first fθ lens 400 in the horizontal direction (i.e., in X-axis direction) is smaller than that in the vertical direction (i.e., in Z-axis direction).

The second fθ lens 500 has a light receiving surface 500A and a light emerging surface 500B. The second fθ lens 500 is secured on the upper surface 10A of the bottom plate 10 using a holding member (not shown).

The second fθ lens 500 is a single element formed of single material, and all the beams L pass through the second fθ lens.

The second fθ lens 500 converges the beams only in the main scanning direction (i.e., in X-axis direction), and does not have a power in the vertical (i.e., auxiliary scanning) direction.

The mirror unit 700 has a characteristic structure for directing the four laser beams emerged from the second fθ lens 500 selectively to the third fθ lenses 600A–600D, respectively.

Specifically, the mirror unit 700 has first to fourth mirror groups 710, 720, 730 and 740.

The first mirror group 710 includes a mirror 712 that directs the laser beam L emitted by the laser diode 120A to the photoconductive drum 600A;

the second mirror group 720 includes mirrors 722 and 724 that direct the laser beam L emitted by the laser diode 120B to the photoconductive drum 600B;

the third mirror group 730 includes mirrors 732, 734 and 736 that direct that laser beam L emitted by the laser diode 120C to the photoconductive drum 600C; and the fourth mirror group 740 includes mirrors 742, 744 and 746 that direct the laser beam L emitted by the laser diode 120D to the photoconductive drum 600D.

The mirrors 712, 722, 724, 732, 734, 736, 742, 744 and 746 are formed to be elongated in the main scanning direction, and secured on the upper surface 10A of the bottom plate 10 using holding members (not shown).

The third fθ lenses 600A–600D are secured on the upper surface 10A of the bottom plate 10 by holders 610A–610D, respectively. Each of the third fθ lenses 600A–600D has a power mainly for converging the incident beam in the auxiliary scanning direction. The third fθ lenses 600A–600D also have power in the main scanning direction, the power in the main scanning direction being less than the power in the auxiliary scanning direction.

On the bottom plate 10, below each of the holders 610A–610D, openings 12A–12D extending in the main scanning direction are formed, and below which the photoconductive drums 20A–20D are arranged, respectively.

The third fθ lenses 600A–600D have light receiving surfaces 600A1–600D1 and light emerging surface 600A2–600D2, respectively.

The positional relationship between the first through fourth mirror groups 710, 720, 730 and 740 with respect to the third fθ lenses 600A–600D will be described.

The mirror 712 of the first mirror group 710 reflects the laser beam emerged from the second fθ lens 500 downward, at 90 degrees when viewed along X-axis direction, to direct the beam toward the light receiving surface 600A1 of the lens 600A at a right angle when viewed along X-axis direction.

The mirror 722 of the second mirror group 720 reflects the laser beam emerged from the second fθ lens 500 upward, by 45 degrees when viewed along X-axis direction, to direct the beam toward the mirror 724. The mirror 724 reflects the incident beam downward, by 45 degrees when viewed along X-axis direction, so that the beam is incident on the light receiving surface 600B1 of the lens 600B at a right angle when viewed along X-axis direction.

The mirror 732 of the third mirror group 730 reflects the laser beam emerged from the second fθ lens 500 obliquely downward to direct the beam toward the mirror 734. The mirror 734 reflects the incident beam obliquely upward to direct the beam to the mirror 736. The mirror 736 reflects the incident beam vertically downward so that the beam is incident on the light receiving surface 600C1 of the lens 600C at a right angle when viewed along X-axis direction.

The mirror 742 of the fourth mirror group 740 reflects the laser beam emerged from the second fθ lens 500 upward, at 90 degrees when viewed along X-axis direction, to direct the beam toward the mirror 744. The mirror 744 reflects the incident beam horizontally to direct the beam to the mirror 746. The mirror 746 reflects the incident beam vertically downward when viewed along X-axis direction so that the beam is incident on the light receiving surface 600D1 of the lens 600D at a right angle when viewed along X-axis direction.

In the embodiment, the first and third fθ lenses are used for converging the light beam mainly in the auxiliary scanning direction, and the second fθ lens is used for converging the light beam mainly in the main scanning direction.

With the above-described configuration, the line image formed at the reflection surfaces 222 of the polygonal mirror 220 is reflected thereby, passed through the first, second and third fθ lenses and converged thereby, and thus, a beam spot is formed on each photoconductive drum.

The horizontal synchronizing signal detection unit 800 includes a single mirror 810, a single light receiving sensor 820, and a control circuit. It should be noted that only a signal unit 800 is provided for the four light beams L, which will be explained later.

The mirror 810 is provided at an upstream position, along the main scanning direction, out of an area contributing to image formation. The mirror 810 is arranged such that only one of the beams L is reflected by the mirror 810 and incident on the light receiving sensor 820. The mirror 810 is secured on the upper surface 10A of the bottom plate 10 by a securing member 812.

The light receiving sensor 820 is secured on the upper surface 10A by a securing member 822 so as to receive the light beam reflected by the mirror 810.

A control circuit (not shown) drives the laser diodes 120A–120D in accordance with the light receiving signal output by the light receiving sensor 820, thereby an image formation starting timing, at which the image formation for each line starts, are synchronized. Specifically, the control circuit controls a laser diode driving circuit in the light source unit 100, thereby the laser diodes 120A–120D are driven.

Operation of the multi-beam scanning optical system constructed as above will be described.

The laser beams emitted by the laser diodes 120A–120D are aligned and emerged from the light source unit 100, and incident on the cylindrical lens 230. Each of the laser beams L are converged by the cylindrical lens 230 in the auxiliary scanning direction, and reaches the reflection surfaces of the polygonal mirror 320 which is revolved at a high speed.

The laser beams deflected by the light reflection surface 322 are incident on the first fθ lens 400 as scanning beams. The beams L are converged mainly in the auxiliary scanning direction by the first fθ lens, and then incident on the second fθ lens 500.

The laser beams L incident on the second fθ lens 500 which is a single element formed of single material is converged in the main scanning direction, and emerged therefrom.

From among the beams L, one emitted by the laser diode 120A is directed, by the first mirror group 710, to the third fθ lens 600A, which converges the beam in the auxiliary scanning direction, and is incident on the photoconductive drum 20A corresponding to the yellow components to form a beam spot traveling in the main scanning direction.

The beam emitted by the laser diode 120B is directed, by the second mirror group 720, to the third fθ lens 600B, which converges the beam in the auxiliary scanning direction, and is incident on the photoconductive drum 20B corresponding to the magenta components to form a beam spot traveling in the main scanning direction.

The beam emitted by the laser diode 120C is directed, by the third mirror group 730, to the third fθ lens 600C, which converges the beam in the auxiliary scanning direction, and is incident on the photoconductive drum 20C corresponding to the cyan components to form a beam spot traveling in the main scanning direction.

The beam emitted by the laser diode 120D is directed, by the fourth mirror group 740, to the third fθ lens 600D, which converges the beam in the auxiliary scanning direction, and is incident on the photoconductive drum 20D corresponding to the black components to form a beam spot traveling in the main scanning direction.

One of the beams L passed through the second fθ lens 500 is reflected by the mirror 810 and is directed to the light receiving sensor 820. Based on the light receiving signal output by the light receiving sensor 820, the controller controls the driving signal of the laser diodes 120A–120D to synchronize the timing for image formation on each photoconductive drum.

According to the above configuration, even in the optical characteristics of the second fθ lens 500 deviate due to temperature change, since the second fθ lens 500 is formed as a single element made of single material, all the beams are affected by the change of the optical characteristics in the same manner, and therefore the images formed on respective photoconductive drums are not displaced with each other in the main scanning direction.

Accordingly, there is no color shift in the color image formed by the printer employing the multi-beam scanning optical system according to the embodiment. Further, since the second fθ lens is formed as a single element made of single material, the structure of the optical system is simplified.

In a conventional multi-beam scanning optical device, a polygonal mirror is provided with a plurality of reflecting surfaces arranged in the direction where the plurality of beams are aligned. In such a configuration, manufacturing errors, tilt errors or the like of the reflecting surface for the plurality of beams may not completely coincide with each other. Therefore, in the conventional device, a horizontal signal detecting sensor should be provided for each beam. That is, a plurality of light receiving sensors and a large room for placing the plurality of sensors are required. Therefore, a manufacturing cost and the size increase. Further, since the sensors should be adjusted individually, the number man-hours is increased.

On the contrary, according to the embodiment described above, the plurality of beams are deflected by a single reflecting surface 322 for each main scanning. Further, only one of the beams deflected by the polygonal mirror 320 is incident on the synchronizing signal detection sensor 820. It is because, since the plurality of beams are deflected by a single reflecting surface 322 at each main scanning, the positional relationship of the beam spots formed by the plurality of deflected beams on the photoconductive drums can be regarded as identical. Therefore, based on the light receiving signal for only one beam, starting positions of the image formation on respective photoconductive drums can be synchronized.

Since only one sensor and one synchronizing signal detection unit are sufficient, manufacturing cost as well as the size of the scanning optical system can be decreased. Further, the number of man-hours can also be reduced. Alternatively, it is of course possible to provide a plurality of sensors and detection units as in the conventional system.

In the above-described embodiment, the number of the beams is four. This is merely an example and the invention is not limited to the described structure. For example, the number of the beams can be three for yellow, magenta and cyan components, the structure of the scanning optical system can be modified according to the number of the beams.

The present disclosure relates to the subject matter contained in Japanese Patent Application No. HEI 11-179222, filed on Jun. 25, 1999, which is expressly incorporated herein by reference in its entirety.

What is claimed is:

1. A multi-beam scanning optical system, comprising:
   a light source unit emitting a plurality of beams, said plurality of beams being parallel to each other;
   a polygonal mirror having a plurality of reflection surfaces arranged along a rotational direction of said polygonal mirror, the plurality of beams emitted by said light source unit being incident on said polygonal mirror and reflected by the reflection surfaces of said polygonal mirror; and
   an fθ lens system including a plurality of lenses, the plurality of beams reflected by the reflection surface of said polygonal mirror passing through said fθ lens system and proceeding toward surfaces to be scanned, said plurality of lenses including a first lens that converges beams passed therethrough in an auxiliary scanning direction, a second lens that converges beams passed therethrough in a main scanning direction, and a third lens, said plurality of beams passing through said first lens, said second lens, and said third lens in this order, said at least one of said plurality of lenses including said second lens,
   wherein the plurality of beams reflected by the reflection surfaces of said polygonal mirror pass through at least one of said plurality of lenses, said at least one of said plurality of lenses being a single lens element formed of single material.

2. The multi-beam optical system according to claim 1, wherein said third lens is provided for each of said plurality of beams, said third lens mainly converges a beam passed therethrough in the auxiliary scanning direction.

3. The multi-beam scanning optical system according to claim 2, wherein a plurality of third lenses are provided at positions facing a plurality of surfaces to be scanned, respectively.

4. The multi-beam scanning optical system according to claim 1, wherein each of the reflection surfaces of said polygonal mirror consists of a single reflection surface that reflects all of said plurality of beams.

5. The multi-beam scanning optical system according to claim 4, further comprising a horizontal synchronizing signal generating system including a light receiving element,
   wherein said light source unit includes a plurality of light sources respectively emitting the plurality of beams,
   wherein one of said plurality of beams deflected by said polygonal mirror is directed to said light receiving element, said plurality of light sources being driven in accordance with an output of said horizontal synchronizing signal generating system.

6. The multi-beam scanning optical system according to claim 1, wherein said light source emits four light beams for forming four different color images.

7. The multi-beam scanning optical system according to claim 6, wherein the four different color include yellow, magenta, cyan and black.

8. The multi-beam scanning optical system according to claim 1, wherein the surfaces to be scanned include surfaces of a plurality of photoconductive drums for forming different color images, rotational axes of said plurality of photoconductive drums extending in the main scanning direction, the rotational axes of said plurality of photoconductive drums being parallel and apart from each other in the auxiliary scanning direction that is perpendicular to the main scanning direction.

9. The multi-beam scanning optical system according to claim 8, wherein said light source emits four light beams for forming four different color images.

10. The multi-beam scanning optical system according to claim 9, wherein the four different color include yellow, magenta, cyan and black.

11. A multi-beam laser printer for forming an image consisting of a plurality of color components in accordance with an electrophotographic imaging process, said printer comprising:

a scanning optical system, including:

a light source unit emitting a plurality of beams, said plurality of beams being parallel to each other;

a polygonal mirror having a plurality of reflection surfaces arranged along a rotational direction of said polygonal mirror, the plurality of beams emitted by said light source unit being incident on said polygonal mirror and reflected by the reflection surfaces of said polygonal mirror; and an fθ lens system including a plurality of lenses, the plurality of beams reflected by the reflection surface of said polygonal mirror passing through said fθ lens system and proceeding toward photoconductive surfaces to be scanned, said plurality of lenses including a first lens that converges beams passed therethrough in an auxiliary scanning direction, a second lens that converges beams passed therethrough in a main scanning direction, and a third lens, wherein the plurality of beams reflected by the reflection surfaces of said polygonal mirror pass through at least one of said plurality of lenses, said at least one of said plurality of lenses being a single lens element formed of single material.

* * * * *